Dec. 13, 1966     S. R. NOVAK     3,290,920
APPARATUS FOR CALIBRATING VAPOR-RESPONSIVE DETECTORS
Filed Feb. 7, 1964
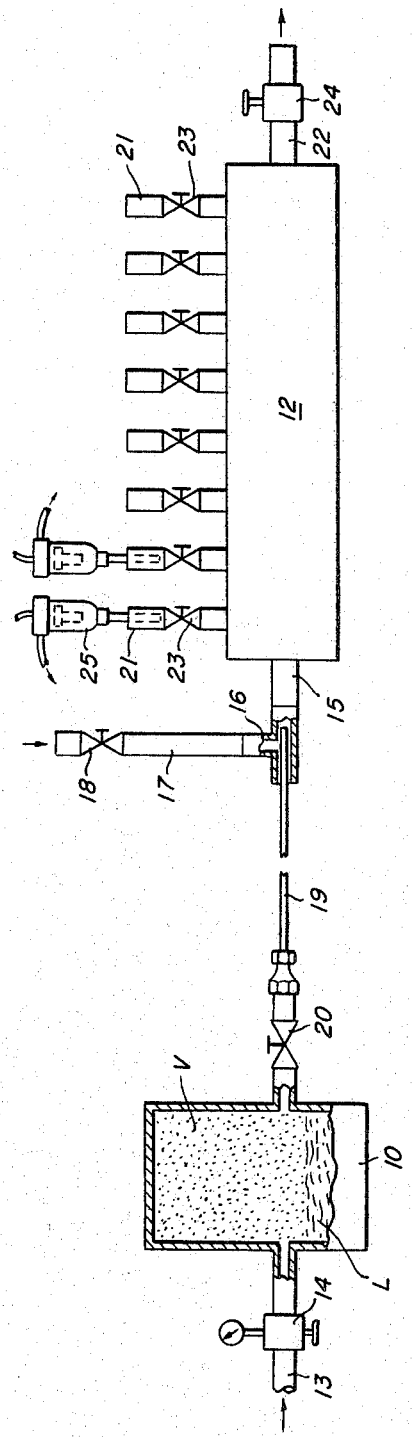
INVENTOR
STEPHEN R. NOVAK
By Donald G. Dalton
Attorney

3,290,920
APPARATUS FOR CALIBRATING VAPOR-RESPONSIVE DETECTORS
Stephen R. Novak, Baldwin Borough, Pa., assignor to United States Steel Corporation, a corporation of Delaware
Filed Feb. 7, 1964, Ser. No. 343,412
2 Claims. (Cl. 73—1)

This invention relates to a method and apparatus for calibrating vapor-responsive detectors.

One method of locating flaws in metal bodies involves applying to the surface of the body a volatile liquid which flows into surface openings, such as seams, scabs, cracks or the like. The liquid commonly is a halogen-containing organic compound, such as trichloroethane. Excess liquid is removed from the surface, leaving no more than a trace except were the liquid has accumulated in a flaw. The surface then is scanned with detectors to locate areas which continue to give off a relatively high concentration of vapors. Such areas represent flaws, which commonly are removed, as by a scarfing operation. This method of locating flaws forms the subject of a patent application by another inventor, but of common ownership to my application.

The detectors used in this method may be adaptations of commercially available devices intended primarily for locating leaks in apparatus which utilize halogen-containing compounds. For example, a detector of this type is manufactured by General Electric Company and is described in a printed publication by the manufacturer, GE Apparatus Catalog-Meter and Instrument Volume, Section 8240. This detector commonly is used for locating leaks in refrigerators which utilize "Freon," one of several fluorine compounds. The detector includes a platinum anode housed within a tubular cathode. A stream of air, which may contain vapors of the halogen compound, is directed between the anode and cathode, while the anode is heated to a temperature in the approximate range 1400–1600° F. The current transmitted therebetween is proportionate to the concentration of halogen compound vapors. The detector is calibrated by introducing an air-vapor mixture of known quantity concentration, and adjusting the anode temperature so that the detector gives a correct reading.

I have observed that detectors calibrated by procedures used previously do not give accurate results in locating flaws. A detector which is calibrated with vapors of any one halogen compound is inaccurate for any other compound, and the inaccuracies in different detectors are not proportionate. That is, if several detectors are calibrated accurately to the same degree with vapors of the same fluorine compound, the detectors are inaccurate by different degrees when used with a particular chlorine compound. Devices are available commercially for calibrating detectors with fluorine compounds, but they rely on the vapor pressure of the compound to introduce vapors to the detector. Such devices are unsuited for calibrating with chlorine compounds used in locating flaws because of their low vapor pressure.

An object of my invention is to provide an improved method and apparatus for calibrating vapor-responsive detectors to enable them to be used for locating flaws.

A further object is to provide an improved calibration method and apparatus which afford accurate results with liquids of relatively low vapor pressure.

A more specific object is to provide an improved calibration method and apparatus which utilize compressed air to blow vapors in controlled concentration from a confined supply into one or more detectors, whereby the detectors can be accurately calibrated to any desired sensitivity for halogen compounds of the type best suited for locating flaws.

In the drawing:

The single figure is a diagrammatic side elevational view of my calibration apparatus with ports broken away.

The apparatus includes a pressure vessel 10 and a header 12. Vessel 10 has an air inlet 13 equipped with a pressure-regulating valve 14. One end of the header 12 has an inlet 15 to which I connect one arm of a mixing T 16. I connect another air supply pipe 17 to the leg of the T. Pipe 17 is equipped with an adjustable valve 18. I connect a capillary tube 19 of known dimensions between vessel 10 and the other arm of the T. Tube 19 is equipped with an on-off valve 20. The header 12 also has a plurality of feeder tubes 21 extending from its top wall and an open-ended exhaust 22 extending from the end opposite the inlet. The feeder tubes are equipped with respective on-off valves 23, and the exhaust with a regulating valve 24.

I mount detectors 25 to be calibrated on one or more of the feeder tubes 21 and open the valves 23 in these tubes. Preferably I calibrate all of the detectors of one flaw-locating apparatus in one operation in order that all are calibrated under identical conditions. The other valves 23 remain closed. Vessel 10 contains a supply L of the liquid I wish to use in calibrating the detectors. I maintain this supply at a constant known temperature. The air mass in the vessel above the liquid L is saturated with vapor V at the selected temperature and pressure. I adjust valve 14 to admit a small volume of air to vessel 10 under a known pressure which I can vary. I open valves 18 and 24 to pass a clean air stream through the header 12 at a predetermined constant flow rate and pressure. Valve 24 regulates pressure in the header 12, which pressure in turn regulates the flow rate through the feeder tubes 21 into the detector 25. I also open valve 20 to admit vapor-saturated air to the clean air stream. The volume of vapor-saturated air is materially smaller than the volume of the clean air stream. Hence adjustment of valve 14 varies the concentration of vapor reaching the detectors without materially affecting the rate of air flow through the header 12. Vessel 10 is sufficiently large that there is no significant decrease in the concentration of saturated air as time passes. Header 12 is sufficiently large that there is no appreciable pressure drop along its length.

I then adjust detectors 25 so that each reads correctly for vapors at the concentration I have introduced. This adjustment is effected by varying the temperature to which the anode of the detector is heated. For some purposes it is desirable to calibrate the detectors to a high degree of sensitivity, in which event I adjust valve 14 to introduce vapors at a low concentration and heat the anodes to a high temperature within the critical range. Other times the detectors should be adjusted to a lower sensitivity, in which event I introduce vapors at a higher concentration and heat the anodes to a lower temperature.

From the foregoing description it is seen that my invention affords a simple method and apparatus for accurately calibrating vapor-sensitive detectors for use in locating flaws. The invention enables a group of detectors to be calibrated under identical conditions and with vapors of the same compound to which they are exposed later in locating flaws. The apparatus also avoids the use of small orifices likely to become clogged under dusty conditions usually prevalent in a steel mill.

While I have shown and described only a single embodiment of my invention, it is apparent that modifications may arise. Therefore, I do not wish to be limited to the disclosure set forth but only by the scope of the appended claims.

I claim:

1. An apparatus for calibrating vapor-responsive detectors comprising a pressure vessel adapted to contain a supply of vapor-forming liquid of relatively low vapor pressure and a mass of vapor-saturated air above the liquid, a header, a plurality of feeder tubes extending from said header and adapted to have detectors mounted thereon for calibration under identical conditions, a clean air inlet and an exhaust connected to opposite ends of said header for passing an air stream therethrough, and means connecting said vessel and said inlet for introducing a relatively small controlled quantity of vapor-saturated air to the air stream, whereby a mixture of air and vapor of known concentration passes through the detectors.

2. An apparatus for calibrating vapor-responsive detectors comprising a pressure vessel adapted to contain a supply of vapor-forming liquid of relatively low vapor pressure and a mass of vapor-saturated air above the liquid, an air inlet connected to said vessel for admitting air at a controlled flow rate, a header, a plurality of feeder tubes extending from said header and adapted to have detectors mounted thereon for calibration under identical conditions, a clean air inlet and an exhaust connected to opposite ends of said header for passing an air stream therethrough, a mixing T connected to said inlet, and a capillary tube connecting said vessel and said T for introducing a relatively small controlled quantity of vapor-saturated air to the air stream, whereby a mixture of air and vapor of known concentration passes through the detectors.

References Cited by the Examiner

UNITED STATES PATENTS

| | | | |
|---|---|---|---|
| 1,162,807 | 12/1915 | Riley | 122—5.5 |
| 2,981,091 | 4/1961 | Roberts | 73—1 |

OTHER REFERENCES

Cram: Journal of Scientific Instruments, vol. 33, July 1956 pp. 273–276.

Schnelle: ISA Journal, April 1957, pp. 128 to 133.

Anon: Instrument Practice, vol. 11, No. 12, December 1957.

LOUIS R. PRINCE, *Primary Examiner.*

S. C. SWISHER, *Assistant Examiner.*